United States Patent [19]
Wechsler et al.

[11] Patent Number: 6,099,738
[45] Date of Patent: Aug. 8, 2000

[54] METHOD AND SYSTEM FOR REMOVING SOLUTES FROM A FLUID USING MAGNETICALLY CONDITIONED COAGULATION

[75] Inventors: Ionel Wechsler, Framingham; Peter G. Marston, Gloucester, both of Mass.

[73] Assignee: Micromag Corporation, Framingham, Mass.

[21] Appl. No.: 08/992,147

[22] Filed: Dec. 17, 1997

[51] Int. Cl.[7] .............................. B03C 1/30; B01D 35/06
[52] U.S. Cl. .......................... 210/695; 210/222; 210/223
[58] Field of Search .................................... 210/695, 723, 210/722, 748, 906, 714, 223, 222, 711, 712, 770; 204/554, 557, 660

[56] References Cited

U.S. PATENT DOCUMENTS

| | | |
|---|---|---|
| 438,579 | 10/1890 | Faunce et al. . |
| 531,183 | 12/1894 | Harris . |
| 2,232,296 | 2/1941 | Urbain et al. ............................ 210/222 |
| 2,652,925 | 9/1953 | Vermeiren . |
| 2,825,464 | 3/1958 | Mack . |
| 3,142,638 | 7/1964 | Blaisdell et al. . |
| 3,228,878 | 1/1966 | Moody . |
| 3,575,852 | 4/1971 | Hughes et al. . |
| 3,676,337 | 7/1972 | Kolm . |
| 3,697,420 | 10/1972 | Blaisdell et al. . |
| 3,767,351 | 10/1973 | Blaser . |
| 3,951,807 | 4/1976 | Sanderson ............................ 210/222 |
| 3,983,033 | 9/1976 | de Latour . |
| 4,089,779 | 5/1978 | Neal . |
| 4,110,208 | 8/1978 | Neal . |
| 4,151,090 | 4/1979 | Fava . |
| 4,153,559 | 5/1979 | Sanderson ............................... 210/222 |
| 4,167,480 | 9/1979 | Mach ...................................... 210/223 |
| 4,193,866 | 3/1980 | Slusarczuk et al. . |
| 4,357,237 | 11/1982 | Sanderson ............................... 210/222 |
| 4,402,833 | 9/1983 | Bennett et al. . |
| 4,427,550 | 1/1984 | Priestley . |
| 4,502,958 | 3/1985 | Sasaki . |
| 4,689,154 | 8/1987 | Zimberg . |
| 4,735,725 | 4/1988 | Reischl et al. . |
| 4,765,908 | 8/1988 | Monick et al. . |
| 4,872,993 | 10/1989 | Harrison . |
| 4,882,064 | 11/1989 | Dixon et al. . |
| 4,940,550 | 7/1990 | Watson . |
| 4,981,593 | 1/1991 | Priestley et al. . |
| 5,009,791 | 4/1991 | Lin et al. ................................ 210/695 |
| 5,064,531 | 11/1991 | Wang et al. ............................ 210/96.1 |
| 5,149,438 | 9/1992 | Hebert .................................... 210/695 |
| 5,369,072 | 11/1994 | Benjamin et al. . |
| 5,397,476 | 3/1995 | Bradbury et al. . |
| 5,560,493 | 10/1996 | Perry . |
| 5,597,479 | 1/1997 | Johnson ................................. 210/192 |
| 5,616,250 | 4/1997 | Johnson et al. . |
| 5,779,908 | 7/1998 | Anderson et al. ...................... 210/703 |
| 5,800,717 | 9/1998 | Ramsay et al. ......................... 210/711 |

*Primary Examiner*—W. L. Walker
*Assistant Examiner*—Marianne S. Ocampo
*Attorney, Agent, or Firm*—Iandiorio & Teska

[57] ABSTRACT

A method for removing a solute from a fluid using magnetically conditioned coagulation includes magnetically conditioning the fluid by applying a conditioning magnetic field to enhance the precipitation of solute particles for coagulation; adding a coagulant to the fluid before, during, or after application of the conditioning magnetic field to coagulate the increased available solute particles to form colloids; and collecting the colloids for removal from the fluid.

89 Claims, 6 Drawing Sheets

METHOD AND SYSTEM FOR REMOVING SOLUTES FROM A FLUID USING MAGNETICALLY CONDITIONED COAGULATION

FIELD OF INVENTION

This invention relates to removing contaminants from a fluid and more particularly, to a method and system for removing contaminants from a fluid using magnetically conditioned coagulation.

BACKGROUND OF INVENTION

Many municipalities world wide discharge their wastewater effluent into local waterways such as rivers, brooks, and ponds. Typically, however, the flow of such waterways is inadequate to carry away the residual nutrients, namely phosphates and nitrates, resulting in eutrophication of those waterways. That is, weeds and algae grow uncontrollably, due to the excessive nutrients, resulting in depletion of available oxygen from the water. This results in killing the fish and amphibians which require the oxygen for survival and ultimately turns the rivers and ponds into swamps, devoid of marine life.

Removing the nutrients (phosphates and nitrates) and other contaminants (cadmium, cromium, copper, lead, mercury, nickel, zinc, etc.) to safe levels is cost prohibitive. Guidelines proposed by the Environmental Protection Agency (EPA) and State Departments of the Environment to reduce the phosphate limits even further exacerbate the need for a cost effective, efficient method for removing the contaminant which will meet or exceed the existing and proposed EPA guidelines.

Recent studies have estimated the cost of nearing, not even achieving, the proposed EPA requirement for even modest sized facilities at tens of millions of dollars. Moreover, even then the existing technology cannot meet the requirements necessary to reverse eutrophication. Other attempts to meet the EPA requirement required a substantially high chemical consumption, and still failed to meet the EPA requirement.

Alternatives to meeting the EPA requirements include natural treatments, constructed wetlands, biological treatments and even relocation of treatment facility effluent, all of which are cost prohibitive. Magnetic filtration and separation systems have been attempted in the past. These systems provided magnetic filtration after coagulation, magnetic seeding, and flocculation. They did not incorporate magnetic preconditioning or magnetic field treatment of any kind. The only use of magnetic fields was in the devices used for filtration of the seeded, e.g. magnetic, flocs from the fluid. They did not recognize the benefit to coagulation of the magnetic field conditioning. Thus, they required comparatively large amounts of chemical reagents. Moreover, they did not achieve sufficient contaminant removal. See U.S. Pat. No. 3,983,033, incorporated herein by this reference.

Magnetic treatment of water is disclosed in U.S. Pat. No. 438,579 where a magnetic field is applied to water flowing through pipes in a closed boiler system in order to prevent minerals from depositing on the inside of the pipes by keeping the minerals suspended and flowing; the minerals are not collected and removed from the system.

Several other processing systems have been implemented to prevent scaling of precipitated minerals by applying a magnetic field transverse to a fluid to precipitate the minerals from solution. However, descriptions of these treatment specifically state that "treatment does not eliminate the hardness salts but alters them physically". The precipitate is not collected. Prior art devices such as Moody, U.S. Pat. No. 3,228,878, do not collect the contaminant but merely change the physical character of scale producing mineral contaminants so that they flow through piping, heat exchangers, and the like, rather than adhere to the walls thus increasing pressure drop and decreasing heat exchange rate.

SUMMARY OF INVENTION

It is therefore an object of this invention to provide an improved system and method for removing solutes using magnetically conditioned coagulation.

It is a further object of this invention to provide such a system which can reduce the solute level for waste water to be within the requirements set by the Environmental Protection Agency.

It is a further object of this invention to provide such a system which is cost effective to implement.

It is a further object of this invention to provide such a system which requires less chemical consumption to remove the solutes.

It is a further object of this invention to provide such a system which occupies less space than existing decontamination systems.

It is a further object of this invention to provide such a system which can be integrated into existing decontamination systems.

It is a further object of this invention to provide such a system which will improve the performance of existing decontamination systems.

It is a further object of this invention to provide such a system which will cost effectively treat very large flow rates.

It is a further object of this invention to provide such a system which uniformly distributes and mixes chemical reagents to maximize their effectiveness.

The invention results from the realization that a truly efficient and cost effective system and method for removing solutes from a fluid can be achieved by magnetically conditioning a fluid by passing the fluid through a high gradient magnetic field before, during or after chemical coagulation and/or the introduction of a nucleation agent to increase both the efficiency and the efficacy of the coagulant by modifying ionic interactions to enhance the formation of colloids.

This invention features a method of removing a solute from a fluid using magnetically conditioned coagulation including magnetically conditioning the fluid by applying a conditioning magnetic field to the fluid to enhance the precipitation of solute particles for coagulation, adding a coagulant to the fluid before, during, or after application of the conditioning magnetic field to coagulate the increased available solute particles to form colloids, and collecting the colloids for removal from the fluid.

In a preferred embodiment the conditioning magnetic field may have an average flux density in the range of 0.1 to 6.0 Tesla. The conditioning magnetic field may have a field gradient in the range of 10 to 2000 Tesla/meter. The conditioning magnetic field may be applied parallel to a direction of fluid flow. The step of adding a coagulant may further include nucleation, by adding a nucleation agent, after coagulation. Collecting may include flocculating, by adding flocculant to the coagulated solute particles, to produce flocs. Collecting may include separating the flocs by sedimentation, after flocculation has been completed, to remove the flocs leaving a clear fluid overflow. Collecting may include adding magnetic seed to the coagulated solute particles prior to flocculation. Collecting may include separating the solute particles by sedimentation, after flocculation has been completed, to remove the flocs. Separating may include supplemental magnetic filtration for filtering small flocs from the clear overflow. Collecting may include primary magnetic filtration by applying a primary magnetic field to the flocs, after flocculation has been completed, to remove the flocs from the fluid. The primary magnetic field may have an average flux density of 0.1 to 6.0 Tesla. The primary magnetic field may have a field gradient in the range of 1 to 2000 Tesla/meter. The primary magnetic field may be applied parallel to the direction of a fluid flow. The step of collecting may include mixing at low r.p.m.'s, after adding flocculant, to create large, loose flocs.

Collecting may include re-circulating the magnetic seed after removing the flocs from the fluid. Collecting may include shearing the flocs into small pieces. Shearing may include agitating the flocs. Shearing may include shearing the flocs through turbulent fluid flow.

Re-circulating the magnetic seed may include secondary magnetic filtration of the magnetic seed from the flocs by applying a secondary magnetic field to the flocs. The secondary magnetic field may have an average flux density in the range of 0.1 to 2.0 Tesla. The secondary magnetic field may have a field gradient in the range of 10 to 1000 Tesla/meter. The secondary magnetic field may be applied parallel to a direction of fluid flow.

Recirculation may include regeneration of the magnetic seed. Regeneration of the magnetic seed may include demagnetization. Demagnetization may include applying a magnetic field in the range of 0.1 to 1.0 Tesla at 400 Hertz. Regeneration may include cleaning the surface of the magnetic seed. Cleaning of the magnetic seed may include washing the magnetic seed with acid. Regeneration may include drying the magnetic seed at a high temperature to calcine the seed surface. Drying the magnetic seed may include heating the magnetic seed with microwaves. Recirculating the magnetic seed may include flushing the magnetic seed with water.

The fluid may contain less than 0.1 ppm of solute after collecting the colloids. The coagulant may be alum, ferric chloride, or lime. The percent by volume of alum may be a 48.6% solution and fed in the system at a rate of 10 to 100 ppm.

The flocculant may be anionic or cationic. Mixing may be at low r.p.m.'s for at least 30 seconds.

The conditioning magnetic field may have a flux density of at least 0.1 Tesla and a magnetic field gradient of at least 10 Tesla/meter. The nucleation agent may be bentonite, the magnetic seed may be magnetite, the solute may be phosphate and the conditioning magnetic field gradient may be 100 Tesla/meter.

The invention also features a method for removing a solute from a fluid using magnetically conditioned coagulation including applying a conditioning magnetic field to the fluid to enhance the precipitation of solutes for coagulation, coagulating the available contaminants, while contemporaneously applying the conditioning magnetic field to the fluid, to precipitate the solute from the fluid to form colloids, and collecting the colloids.

The invention also features a method for removing a solute from a fluid using magnetically conditioned coagulation including coagulating the solute with a coagulant to precipitate solute particles from the fluid, applying a conditioning magnetic field to the coagulated solute particles to enhance coagulation of the solute particles by increasing application of the solute particles to the coagulant to form colloids, and collecting the colloids.

The invention also features a method for removing a solute from a fluid using magnetically conditioned coagulation including coagulating the solute particles with a coagulant to precipitate the solute particles from the fluid, adding a nucleation agent for receiving the solute particles, and applying a conditioning magnetic field to the coagulated solute particles and nucleation agent to enhance application of the solute particles to the coagulant and deposition of the particles on the nucleation agent.

The invention also features a system for removing a solute from a fluid using magnetically conditioned coagulation including means for magnetically conditioning the fluid by applying a conditioning magnetic field to enhance the precipitation of solute particles for coagulation, means for adding a coagulant to the fluid before, during, or after application of the conditioning magnetic field to coagulate the increased available solute particles to form colloids and means for collecting the colloids from the fluid.

In a preferred embodiment the conditioning magnetic field may have an average flux density in the range of 0.1 to 6.0 Tesla. The conditioning magnetic field may have a field gradient in the range of 10 to 2000 Tesla/meter. The conditioning magnetic field may be applied parallel to the direction of the fluid flow. The means for adding a coagulant may further include nucleation means for adding a nucleation agent. The means for collecting may further include flocculation means, for producing flocs of the available solute particles. The means for collecting may include separator means, responsive to the flocculation means, for separating the flocs from the fluid. The separator means may include sedimentation means in which the flocs settle to the bottom of the sedimentation means and clear fluid overflows the sedimentation means.

The means for collecting may further include seeding means, for adding magnetic seed to the magnetically conditioned fluid. The means for collecting may further include separator means, responsive to the flocculation means, for separating the flocs from the fluid. The separator means may include sedimentation means in which the flocs settle to the bottom of the sedimentation means and clear fluid overflows the sedimentation means. The separator means may further include supplemental magnetic filtration means for filtering small flocs from the fluid overflow. The separator means may include primary magnetic filtration means, responsive to the magnetic seeds, for applying a primary magnetic field to the flocs to separate the flocs from the fluid. The primary magnetic field may have a high field of at least 0.1 Tesla. The primary magnetic field may have a high magnetic field gradient of at least 1 Tesla/meter. The primary magnetic field may be applied parallel to the direction of fluid flow.

The means for collecting may further include seed collection means for collecting the magnetic seed from the separated flocs and recirculating means for recirculating the magnetic seed collected by the seed collection means to the seeding means. The seed collection means may further include shearing means for separating the magnetic seed from the flocs. The recirculating means may include regeneration means for regenerating the magnetic seed. The regeneration means may include demagnetization means for demagnetizing the magnetic seed. The regeneration means may include acidic wash means for cleaning the surface of the magnetic seed. The regeneration means may include drying means. The drying means may include microwave means for applying microwave energy to the magnetic seed to dry the seed.

The primary magnetic filtration means may include a primary magnetic separator. The primary magnetic separator may be a continuous, high gradient magnetic separator, a cyclic high gradient magnetic separator, or a wet-drum type magnetic separator.

The seed collection means may include secondary magnetic filtration means. The secondary magnetic filtration means may include a secondary magnetic separator. The secondary magnetic separator may be a continuous high gradient magnetic separator, a cyclic high gradient magnetic separator, or a wet-drum type magnetic separator. The means for magnetically conditioning may include a filamentary matrix having a length of 6 to 12 inches in the direction of fluid flow. The filamentary matrix may be stainless steel. The stainless steel may be cold worked to induce an austenitic to martensitic phase transformation. The filamentary matrix may be bounded by an iron bound solenoid. The filamentary matrix may be bounded about its periphery by a DC energizing coil for inducing the magnetic field. The filamentary matrix may include an upstream and a downstream end, the upstream end bounded by a magnetic pole having a plurality of passageways there through and the downstream end may be bounded by a second magnetic pole having a plurality of passageways therethrough, such that a fluid flow is allowed to pass through the first magnetic pole, the upstream end, the downstream end, and the second magnetic pole. The first and second magnetic poles may be oriented to provide a uniform application of the magnetic field to the filamentary matrix.

The flux density of the magnetic field may be in the range of 0.1 to 6.0 Tesla in a direction normal to the first and second magnetic poles. The magnetic field may have a field gradient in the range of 10 to 2000 Tesla/meter. The filamentary matrix may be bounded at an upstream and by first permanent magnet and at a downstream and by a second permanent magnet, the permanent magnet producing a magnetic field of at least 0.1 Tesla.

The means for magnetically conditioning may include an upstream end and a downstream end and inlet means for uniformly introducing the fluid over the upstream end of the means for magnetically conditioning. The means for magnetically conditioning may include a outlet port for discharging the fluid to a region of non-turbulent flow. The region of non-turbulent flow may provide a retention time of at least 15 seconds to enhance formation of colloids.

The means for magnetically conditioning may further include an upstream end and a downstream end and the means for adding a coagulant may further include introduction means for introducing the coagulant to the fluid. The introduction means may further include distribution means for uniformly distributing the coagulant over the upstream end.

The magnetic seed may be magnetite, the fluid may contain less than 0.1 ppm of solute after removal of the solute particles, the solute may be phosphate and the fluid may flow at a rate of 10 cm/sec. The primary magnetic separator may include a filamentary matrix and the secondary magnetic separator may include a filamentary matrix.

The invention also features a method of removing a solute from a fluid using magnetically conditioned coagulation comprising magnetically conditioning the fluid by applying a conditioning magnetic field to the fluid to enhance the precipitation of solute particles for coagulation, adding a nucleation agent to the fluid before, during, or after application of the conditioning magnetic field to coagulate the increased available solute particles to form colloids, and collecting the colloids for removal from the fluid.

The invention also features a system for removing a solute from a fluid using magnetically conditioned coagulation comprising means for magnetically conditioning the fluid by applying a conditioning magnetic field to enhance the precipitation of solute particles for coagulation, means for adding a nucleation agent to the fluid before, during, or after application of the conditioning magnetic field to coagulate the increased available solute particles to form colloids, and means for collecting the colloids from the fluid.

DISCLOSURE OF PREFERRED EMBODIMENT

Other objects, features and advantages will occur to those skilled in the art from the following description of a preferred embodiment and the accompanying drawings, in which.

Although specific features of this invention are shown in some drawings and not others, this is for convenience only as each feature may be combined with any or all of the other features in accordance with the invention.

Figure 1:
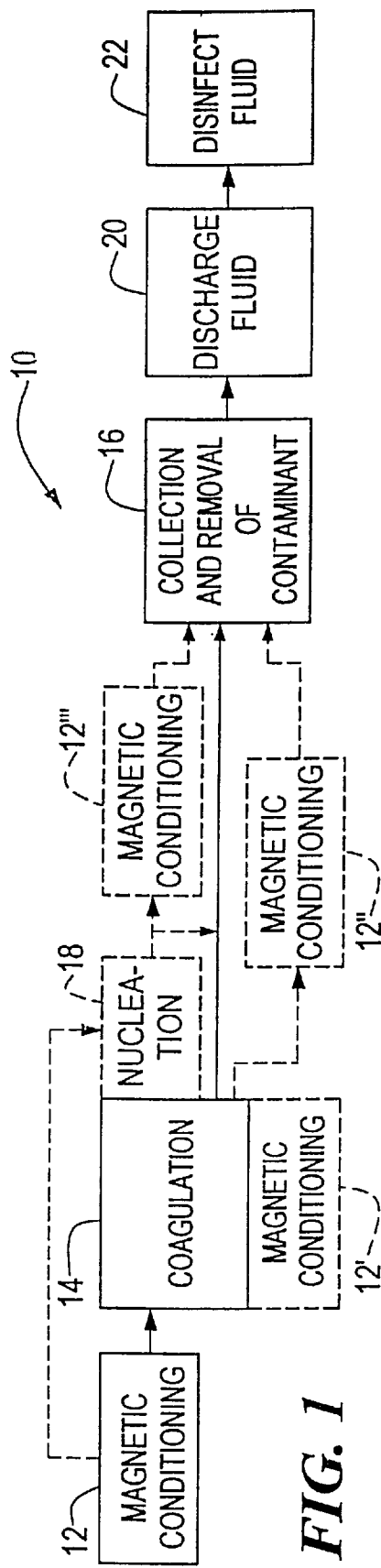
FIG. 1 is a schematic block diagram of a system for removing solutes using magnetically conditioned coagulation according to this invention in which magnetic conditioning may occur before coagulation, during coagulation, after coagulation or after coagulation and nucleation.

The system for removing solutes from a fluid using magnetically conditioned coagulation is shown generally as reference numeral 10, FIG. 1. In a preferred embodiment, a fluid, for example waste water effluent from a sewage treatment plant after sludge sediment removal, undergoes magnetic conditioning 12 by applying a high magnetic field parallel to the fluid flow, the fluid flow having a velocity of at least 3 cm/sec. After magnetic conditioning 12 the fluid undergoes coagulation 14 to precipitate the contaminant, e.g. phosphate, from the fluid to form colloids. It has been found that magnetic conditioning of the fluid allows the solute, in this case a contaminant such as phosphate, to become more readily available for coagulation, allowing the coagulant to become more efficient. The result is that much smaller quantities of coagulant are required than in previous purification systems, yet more contaminant, e.g. phosphate, precipitates from the fluid. However, the present invention may be used to remove valuable solutes to be utilized in various applications, and is in no way limited to phosphate removal from waste water.

After coagulation 14 of the solute, the precipitated solute particles, colloids, undergo collection 16. Once collection of the colloids is complete, the fluid is discharged 20 with a solute level of less than 0.05 parts per million (ppm). The decontaminated fluid may undergo further processing including disinfection 22 if necessary to remove bacteria from the fluid.

While in the embodiment in FIG. 1 system 10 performs magnetic conditioning 12 prior to coagulation 14, magnetic conditioning may also occur contemporaneously with coagulation, magnetic conditioning 12', after coagulation, magnetic conditioning 12", or after coagulation 14 which includes nucleation 18, magnetic conditioning 12''', all shown in phantom, to enhance precipitation and attachment of the solute to the coagulant and/or the nucleation agent. The various embodiments have been shown in phantom in order to reduce the number of drawings. However, one skilled in the art will realize that magnetic conditioning need only take place either before, during or after coagulation where coagulation may be defined as including or not including nucleation. The dramatic improvement using the magnetic conditioning taught by this invention is due to the effect of the magnetic field on ionic interactions of the solute which modifies the hydration of the ions, creating favorable conditions for the formation of new ionic associates which enhance the formation of colloids.

Magnetic conditioning also changes the internal energy of the system which further influences intermolecular interactions. The magnetic field influences the surface forces of the colloids causing the magnetic dipoles to align, thus creating forces which further enhance the growth of the colloidal particles.

The Lorentz VXB forces on the moving electrical charges also tend to align the electric dipoles. This alignment of previously randomly oriented dipoles enhances the regrouping of existing ionic associates which enhances the formation of colloids. Coagulation enhancement is thus influenced by the magnitude of the magnetic field, the gradient of the magnetic field, the orientation of the magnetic field with respect to the direction of the fluid flow and the velocity of the fluid flow in the region of the magnetic field.

Although the preferred location of the magnetic conditioning means is prior to coagulation and the preferred orientation of the magnetic field is parallel to the direction of the fluid flow, the effects described herein will occur independent of its location in the flow treatment system or the orientation of its field with respect to the fluid flow.

In a preferred embodiment it is also a purpose of the magnetic conditioning means to create local turbulent mixing to reduce the equivalent mean free path of magnetically modified ionic species to enhance the creation of new associates. In the presence of the means for introducing such turbulent mixing, the parallel flow creates a combination of magnetic and hydrodynamic conditions which favor the electrochemical interaction which initiates nucleation of the colloid.

For the process variation wherein the coagulant is introduced ahead of, or in, the region of magnetic field, it is also important to create adequate turbulence to assure intimate mixing of the reagent throughout the body of the fluid.

For optimum performance the magnetically conditioned coagulation should be followed by a region of more quiescent, non-turbulent flow to provide time for the formation and growth of colloids.

Although the effect of the preconditioning disappears with time (up to one hour) it is maximized with a retention time of up to ten minutes between the preconditioning and addition of the chemical coagulant. In the case of contemporaneous magnetic conditioning and coagulation, the retention time is up to two minutes after coagulation.

Figure 1A:
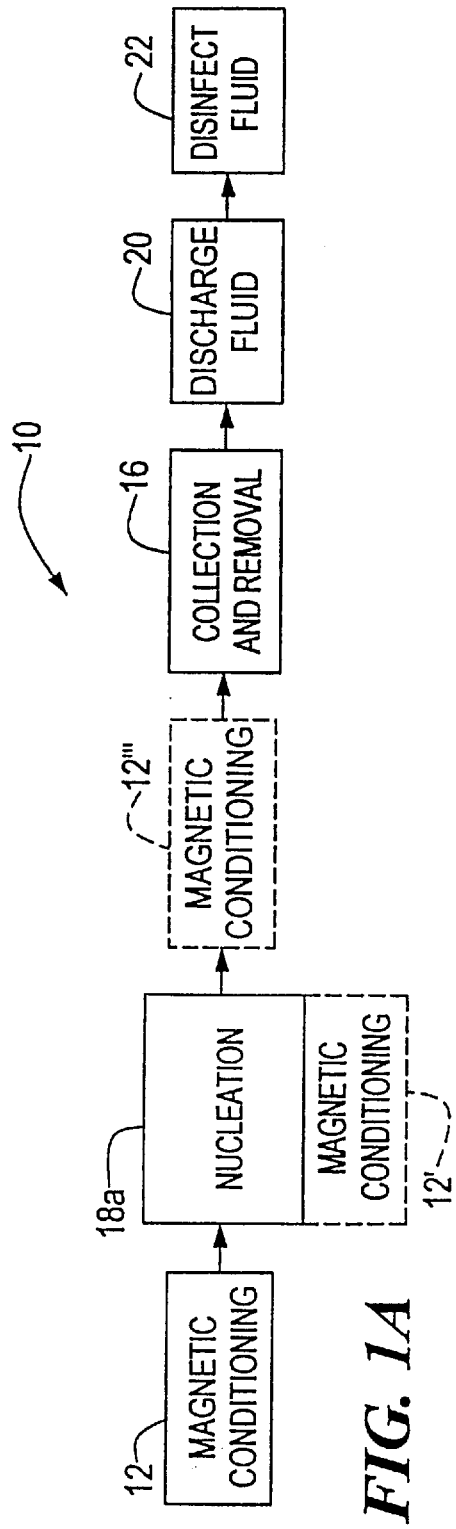
FIG. 1A is a schematic block diagram, similar to FIG. 1, in which coagulation is performed without a coagulant by adding a nucleation agent only.

In yet another embodiment, it has been found that a coagulant is not always necessary. After magnetic conditioning 12, FIG. 1A, coagulation is enhanced by nucleation 18a which is performed with the addition of a nucleation agent. Once nucleation 18a is complete, the coagulated particles are collected and removed 16.

However, as shown above with reference to FIG. 1, magnetic conditioning may also take place contemporaneously with nucleation, magnetic conditioning 12', or after nucleation, magnetic conditioning 12''', both shown in phantom.

In summary, system 10 may comprise several embodiments by incorporating magnetic conditioning before, during, or after coagulation 14 or after coagulation 14 and nucleation 18, prior to collection and removal 16 of the solute, or before, during, or after nucleation 18a, prior to collection and removal 16. While system 10 may be used to remove various solutes, it has been found extremely effective in removing phosphates from sewage effluent. By magnetically conditioning waste water effluent, it has been found that phosphate levels of the discharged fluid may be reduced to less than 0.025 ppm, well below the proposed EPA requirement of 0.1 ppm required to control eutrophication.

Figure 2:
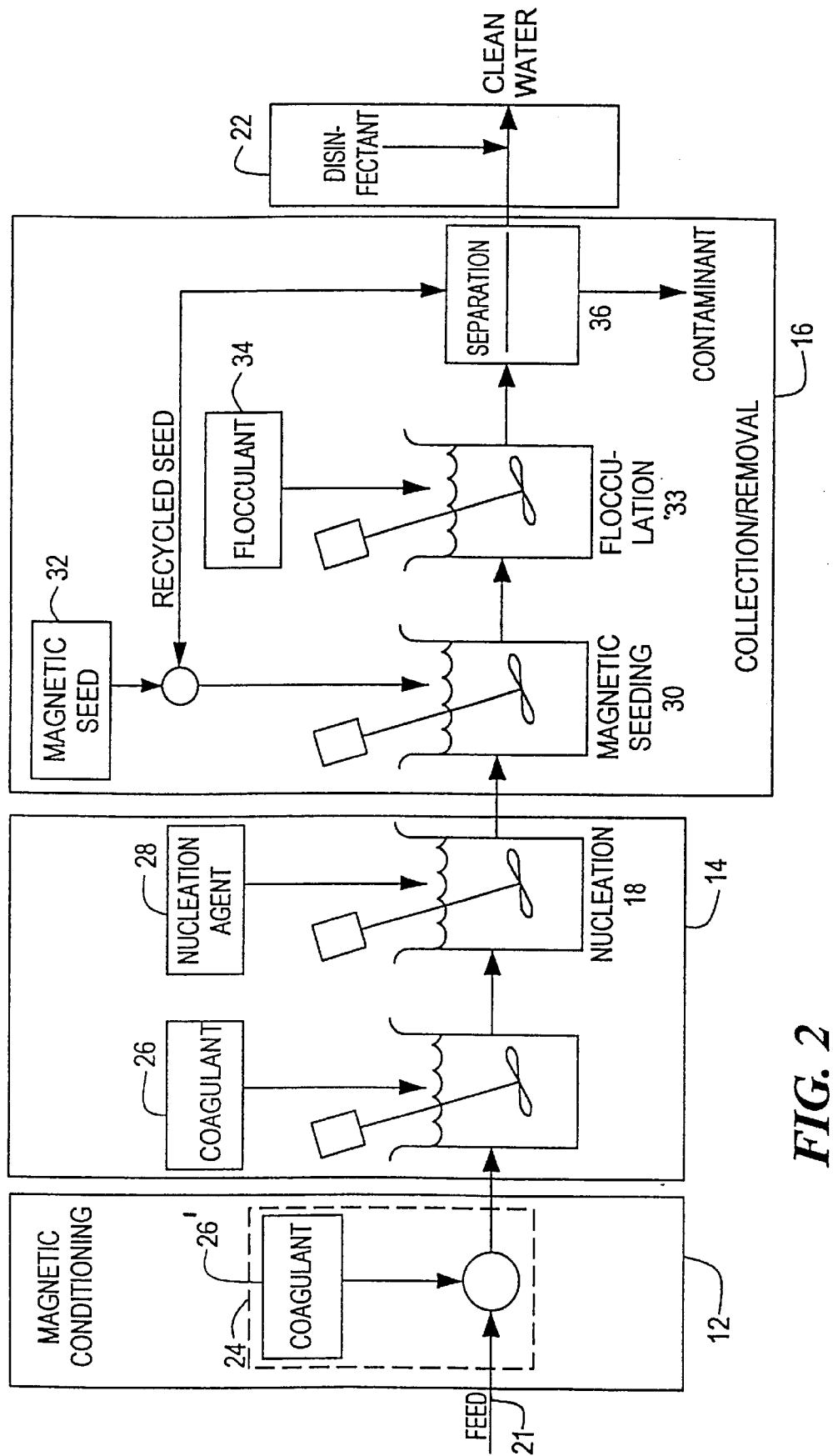
FIG. 2 is a schematic flow diagram, similar to FIG. 1, including the additional collection/removal sub-steps of magnetic seeding, flocculation, separation and removal of the solute and recovery and recycling of the magnetic seed.

In a preferred embodiment, magnetic conditioning 12 includes magnetic preconditioning means 24, FIG. 2, which applies a high magnetic field having an average flux density of 0.1 to 6.0 Tesla and a field gradient of 10 to 2000 Tesla/meter. The magnetic field is applied parallel to the flow of the fluid which is indicated by arrow 21. After magnetic conditioning 12 of the fluid, the fluid undergoes coagulation 14 by adding a coagulant 26 such as alum, ferric chloride, lime, or any other suitable coagulant to the magnetically conditioned fluid. Alternatively, all or a portion of the coagulant can be introduced contemporaneously 26' directly into the magnetic preconditioning means 24.

Coagulation 14 may include nucleation 18 in addition to coagulation. Nucleation 18 may be performed contemporaneously with coagulation 14. A nucleation agent 28, such as bentonite available through American Colloid Co, Arlington Heights, Ill., is added to the magnetically conditioned solution. The addition of a nucleation agent to the magnetically conditioned and coagulated fluid provides additional sites for deposition of the phosphate, thus allowing greater precipitation of the solute from the waste water to increase the amount of phosphate removed from the fluid.

Once nucleation has been completed, the solute, for example phosphate, undergoes collection and removal 16. The magnetically conditioned slurry of fluid, treated with alum and bentonite, undergoes magnetic seeding 30 in which a magnetic seed 32, such as magnetite which is a natural ore such as that produced by Northshore Mining Co., Silver Bay, Minn., is added to aid in the separation of the phosphate. However, this is not a necessary limitation as any other magnetic material may be used as magnetic seed. Magnetite is chosen because its amphoteric surface provides natural and highly effective scavenging of microbiological contaminants such as coliform bacteria, viruses and other micron-sized pathogens such as cryptosporidium parvum and giardia lamblia thereby requiring less disinfectant. Once magnetic seeding 30 is complete, the magnetically conditioned slurry undergoes flocculation 33 in which flocculant 34 is added to form loose flocs containing coagulated phosphate, nucleation agent 28, magnetic seed 32 and any remaining suspended solids present in the fluid being treated. One such flocculant is Percol 737, manufactured by Allied Collids, Suffolk, Va. or, Magnifloc, manufactured by Cytec Industries, of West Paterson, N.J. Flocculant 34 may be anionic or cationic, depending on the nature of coagulant 26 and the pH of the effluent.

After flocculation 33 the flocs are removed from the fluid by separator 36. Once separation has been completed, magnetic seed 32 is separated from the flocs and recirculated to magnetic seeding 30.

Figure 3:
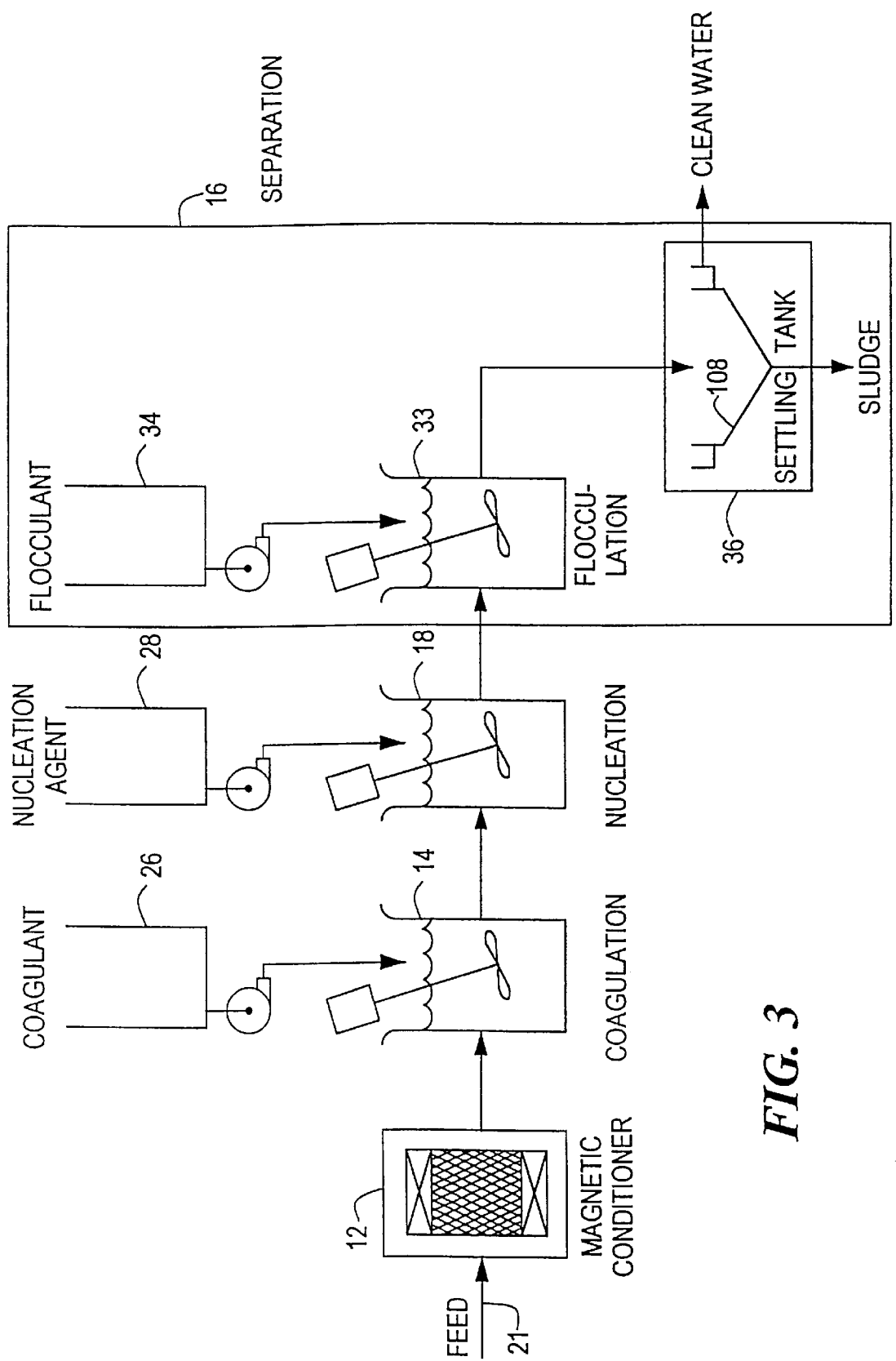
FIG. 3 is a detailed schematic flow diagram, similar to FIG. 1, of a system according to this invention in which magnetic conditioning occurs before coagulation and the solutes are separated for collection and removal by flocculation and sedimentation without magnetic seeding.

Alternatively, magnetic conditioning 12, FIG. 3, coagulation 14 and nucleation 18, may occur to enhance collection and removal 16 of solute particles as discussed above, however, flocculation 33 occurs without magnetic seeding and separation 36 takes place through sedimentation. Flocculation 33 creates loose flocs. Separation 36 through sedimentation is achieved by allowing adequate time for the flocs to settle to the bottom of the settling tank 108. The phosphate-containing sludge is removed from the bottom of tank 108 for further processing and disposal while clean water flows from the top of the settling tank for further processing such as disinfection and storage.

Figure 4:
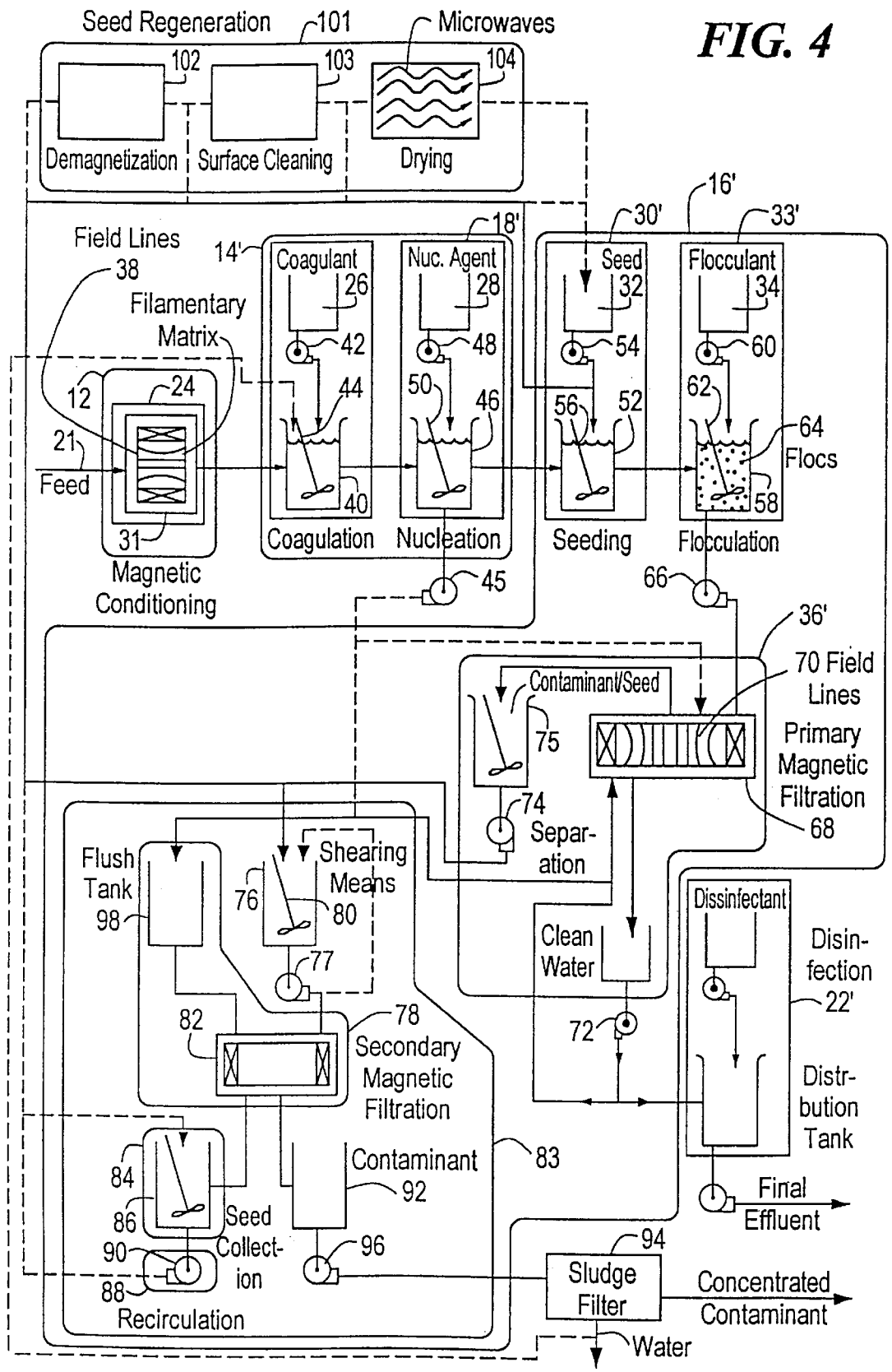
FIG. 4 is a detailed schematic flow diagram, similar to FIG. 2, in which the solutes are separated for collection and removal by magnetic filtration followed by magnetic separation of the magnetic seed from the sludge, recycling of the seed, and regeneration of the seed surface.

Magnetic conditioning 12, FIG. 4, includes magnetic conditioning means 24 which may include a magnetic conditioner. Magnetic conditioning means 24 applies magnetic field 38, having a magnetic gradient of at least 10 Tesla per meter parallel to the direction of fluid flow 21. In a preferred embodiment the best results are obtained with a magnetic field gradient of at least 100 Tesla per meter. The magnetically conditioned effluent is fed into coagulation means 14' which include coagulation tank 40. Coagulant 26 is also fed into coagulation tank 40 by coagulation pump means 42. Coagulant 26 may be fed at a rate of 10–100 ppm. Where the contaminant is phosphate, coagulant 26, such as alum, is added to obtain a ratio of 10–100 ppm, or 48.6% solution by volume, depending on the initial phosphate content and the desired reduction level. Coagulation mixing means 44 intensely mixes coagulant 26 with the magnetically conditioned effluent. The intense mixing should last for at least 3 minutes in order to obtain complete mixing of coagulant 26 with the effluent.

Coagulation means 14' may also include nucleation means 18', which includes nucleation tank 46. The slurry containing the magnetically conditioned effluent and coagulant 26 is fed from coagulation tank 40 into nucleation tank 46. Nucleation agent 28 is fed into nucleation tank 46 by nucleation pump means 48 at a rate of 25–100 ppm. Nucleation mixing means 50 mixes the slurry and nucleation agent 28. In a preferred embodiment, the mixing lasts at least 3 minutes, however, the mixing need not be as intense as coagulation mixing means 44.

The slurry containing the magnetically conditioned fluid, coagulant 26 and nucleation agent 28 is then fed into magnetic seeding means 30', of collection and removal means 16', which includes seeding tank 52. Magnetic seed 32, such as coarse magnetite, is fed into seeding tank 52 by seeding pump means 54. Good results are obtained when magnetic seed 32 is added at a rate of 2,000–5,000 ppm. Seed mixing means 56 mixes the slurry and magnetic seed 32 thoroughly. Typically the mixing time is at least 1 minute. It has also been found that by adding large amounts of magnetic seed 32, the mixing time may be reduced. In order to ensure thorough, complete mixing, the mixing can be done in the respective tanks. However, this is not a limitation to the invention. Mixing may also be accomplished by static in-line mixers which would replace the tanks and mixing means shown in the figure, or both.

The slurry now containing the magnetically conditioned fluid, coagulant 26, nucleation agent 28 and magnetic seed 32 is fed into flocculation tank 58 where flocculant 34 is added by flocculation pump means 60 at a rate of 0.5–2.0 ppm.

In order to create large loose flocs 64 from which the magnetic seed can be more easily separated for recycling, flocculation mixing means 62 mixes the slurry at low r.p.m.'s so that the flocs will not be sheared apart. Good results are obtained with flocculation mixing times of at least 30 seconds but no more than 3 minutes.

After flocculation 33' is complete the slurry, comprised of clean water and flocs 64, is pumped into separator 36' by separator pump means 66. Separator pump means 66 includes a positive displacement pump such as a piston and diaphragm or a screw type pump in order to avoid shearing apart flocs 64. Separator 36' may include primary magnetic filtration means 68 and may be a continuous high gradient, cyclic high gradient or wet-drum type magnetic separator. Primary magnetic filtration means 68 applies a high magnetic field having an average flux density of 0.1 to 6.0 Tesla and a field gradient from 1 to 2000 Tesla/meter, characterized by magnetic field lines 70, to the slurry to remove from the effluent flocs 64, which contain magnetic seed 32, coagulant 26, nucleation agent 28, entrapped phosphate and other suspended solids. The magnetic field is preferably applied parallel to the direction of fluid flow. The clear water is removed from separator 36' by discharge pump means 72.

Magnetic seed 32 collected by primary magnetic filtration means 68 may be flushed from primary magnetic filtration means 68 by using clean water from discharge pump means 72, or using raw water which has already been treated with coagulant 26 and nucleation agent 28 from nucleation pump means 45.

The separated flocs 64 are collected in collection tank 75 and then pumped from separator 36' by removal pump 74 back into seeding tank 52. The solute (phosphate) loaded seed can be recycled up to ten times, after which the separated flocs 64 are eventually collected in collection tank 75 and pumped by removal pump 74 into shearing tank 76 of seed collection means 83. Shearing tank 76 includes shearing means 80 which shear the flocs into small pieces. Shearing means 80 may include agitating the flocs to produce small pieces. The sheared flocs are then fed to secondary magnetic filtration means 78, which may include secondary magnetic separator 82, (e.g. a continuous high gradient, cyclic high gradient, or wet-drum type magnetic separator), by shearing pump 77. Alternatively, flocs may be sheared into small pieces by turbulent flow through secondary magnetic separator 82.

In the event that the secondary magnetic separator 82 is a high gradient magnetic separator, shearing of the flocs may be accomplished by turbulent flow within the matrix of secondary magnetic separator 82.

Secondary magnetic filtration means 78 applies a high magnetic field with a flux density in the range of 0.1 to 2.0

Tesla and a field gradient of 1 to 1000 Tesla/meter to the sheared flocs to separate magnetic seed 32 from the sheared flocs. The recovered magnetic seed 32 is collected by seed collector 84 which includes seed collection tank 86. The collected magnetic seed 32 is then recirculated by recirculation means 88, which includes recirculation pump 90, which returns the magnetic seed 32 to magnetic seeding means 30'.

The sheared flocs from which the magnetic seed 32 has been removed, are collected by sludge collection tank 92 and are then pumped to sludge filter 94 by sludge pump means 96. Water is removed from the sludge by sludge filter 94 and may be returned to coagulation tank 40. The sludge may be further treated by additional means such as biological activation typical of waste water treatment facilities and well known to those skilled in the art.

Magnetic seed 32 collected by secondary magnetic filtration means 78 may be flushed from secondary magnetic separation means 78 by using clean water from discharge means 72.

By recirculating magnetic seed 32, the amount of flocculant 34 required may be reduced. Further, less magnetic seed 32 is required and thus less space is required to maintain magnetic seed 32. Thus, regenerating magnetic seed decreases operation costs.

Regeneration of seed 32 may be accomplished by diverting all or a portion of the recycled seed discharged from recirculation pump 90 through seed regeneration means 101. Regeneration means 101 may include seed demagnetization means 102, seed surface cleaning means 103, and seed drying means 104, any or all of which may be used independently or in any combination. Seed demagnetizing 102 is accomplished by passing the seed through an alternating magnetic field of 0.1 to 1.0 Tesla and 400 Hertz. Seed surface cleaning means 103 may include acidic chemical cleaning such as acetic, chlorhidric, or sulfuric acid washing. Drying means 104 may include microwave heating, or convection oven heating, preferably in an oxygen-free environment. The seed is dried at a very high temperature to calcine the seed surface, but below the melting point or fusing point of the seed.

Figure 5:
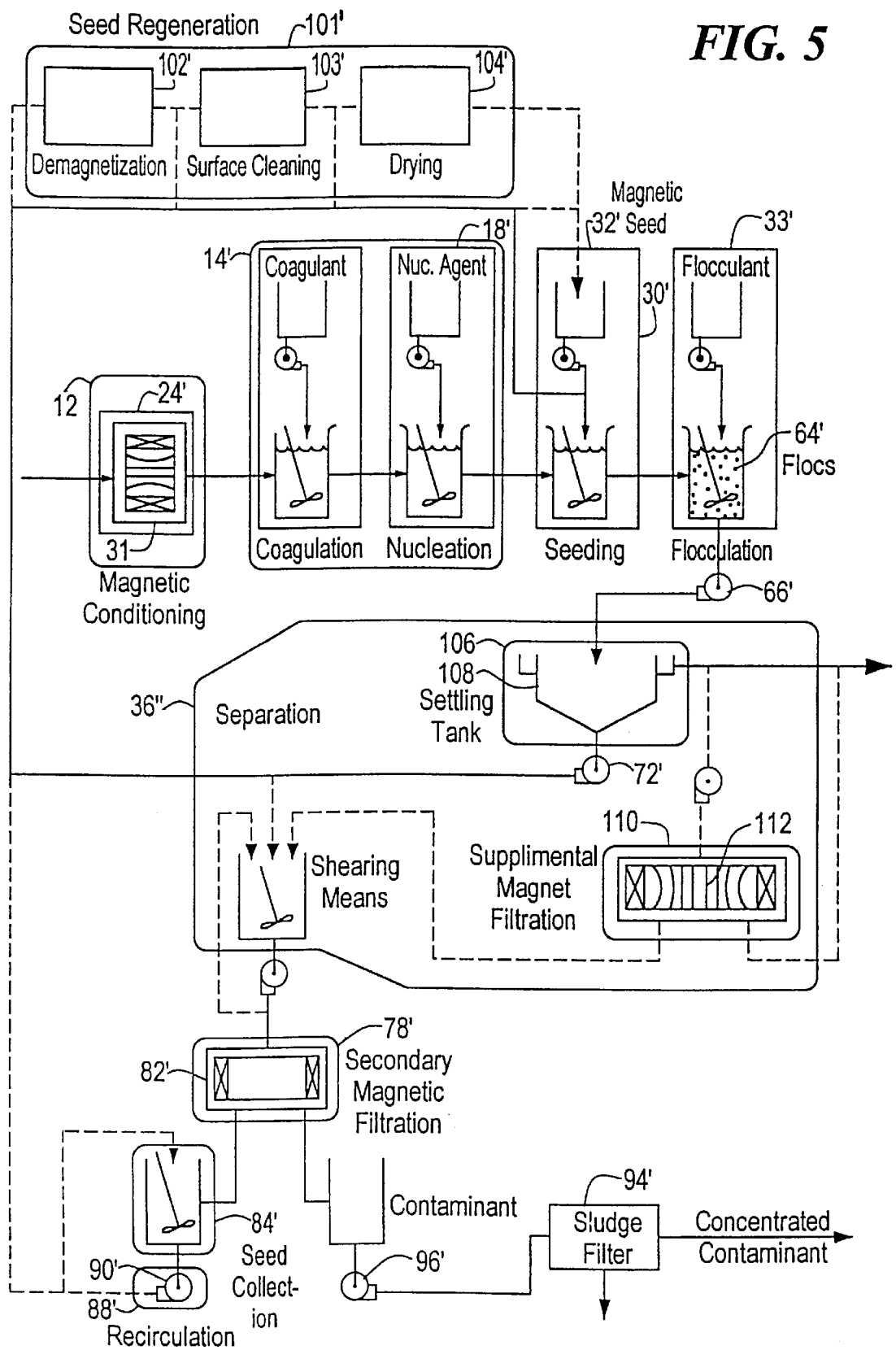
FIG. 5 is a detailed schematic flow diagram, similar to FIG. 2, in which the solutes are separated for collection and removal by sedimentation followed by magnetic separation of the magnetic seed from the sludge, recycling of the seed and regeneration of the seed surface.

In another embodiment, magnetic preconditioning means 12, FIG. 5, coagulation means 14', nucleation means 18', magnetic seeding means 30' and flocculation means 33' are the same as discussed above with reference to FIG. 4. However, separator means 36" includes sedimentation means 106, similar to that discussed in FIG. 3, instead of magnetic filtration. Separator pump means 66' feeds flocs 64' into sedimentation means 106 which may include settling tank 108. Magnetic seed 32' accelerates the settling velocities of flocs 64' in settling tank 108. Typical settling velocities are enhanced to greater than 0.5 cm/sec, dramatically decreasing the time it takes for flocs 64' to settle.

Provided that flocculation 33' has formed large, loose flocs 64', the overflow of sedimentation means 106 is a clear fluid which overflows settling tank 108 into supplemental magnetic filtration means 110 which magnetically separates smaller flocs that may have been created by disturbances in the flow of flocs 64' into settling tank 108 from separator pump means 66' and, because of their small size, did not settle in sedimentation means 106.

Supplemental magnetic filtration means 110, similar to primary magnetic filtration means 68, and secondary magnetic filtration means 78, FIG. 4, applies a high magnetic field, represented by magnetic field lines 112, of at least 0.1 Tesla and a magnetic field gradient of at least 10 Tesla/meter.

In a preferred embodiment the magnetic field gradient is at least 100 Tesla/meter. The slurry collected in settling tank 108 of sedimentation means 106 is then processed in a manner similar to that of FIG. 4. Flocs 64' are collected and fed by removal pump means 72' to secondary magnetic filtration means 78' which includes secondary magnetic separator 82'. Magnetic seed 32' is collected by seed collector means 84' and recirculated by recirculation means 88'. Recirculation means 88' includes recirculation pump 90' which recirculates the collected magnetic seed 32' to magnetic seeding means 30'. The recirculated magnetic seed may be recirculated directly into the magnetically conditioned, coagulated fluid, or it may be added to magnetic seed 32'.

Periodic seed regeneration means 101' including seed demagnetization means 102', seed surface cleaning means 103', and seed drying means 104' are the same as discussed above with reference to FIG. 4. Magnetic conditioning 12, may include magnetic conditioning means 24 and coagulant feed means 26', FIG. 3.

Figure 6:
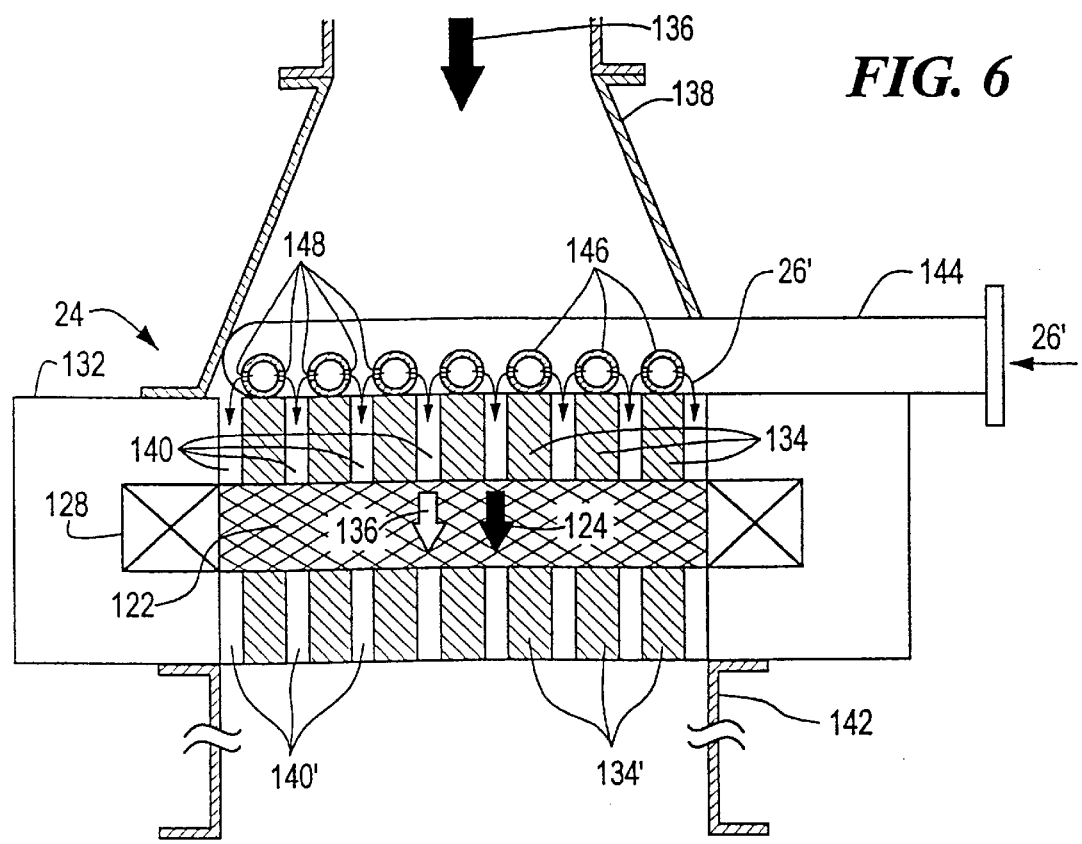
FIG. 6 is a schematic cross-sectional view of the magnetic conditioner oriented transverse to the direction of the magnetic field and the fluid flow.

Magnetic conditioning means 24, which can be circular or rectangular in cross section, FIG. 6, provides a magnetizing field indicated by arrow 124 throughout a working volume occupied by ferromagnetic, filamentary matrix 122 having a length of 6–12 inches in the direction of fluid flow 136. The field strength should be in the range of 0.1 to 6.0 Tesla which may be derived from either conventional or superconducting coil windings or permanent magnets. Magnetic conditioning means 24 may include an iron bound solenoid comprised of DC energizing coil 128 surrounded by a low carbon steel magnetic frame comprised of a flux return portion 132 and magnetic pole plates 134 arrayed and supported on either surface of ferromagnetic filamentary matrix 122 for producing the magnetic field. Field strengths in excess of 6.0 Tesla can be derived with the use of super-conducting energizing coil windings. Magnetic flux in the range of 0.1 to 6.0 Tesla is induced throughout the entire volume bounded by coil 128 and pole plates 134 in a direction indicated by arrow 124, normal to the internal pole surfaces. Magnetic field 124 magnetizes the matrix filaments transverse to their long dimension, thereby creating very high magnetic field gradients at the filament edges which are aligned with magnetizing field 124. Ferromagnetic filamentary matrix 122 includes layered stainless steel wool or expanded metal, each of which is characterized by very sharp edges which help to create very high magnetic field gradients.

Fluid to be treated indicated by arrow 136 is introduced to the upstream surface of magnetic conditioning means 24 via primary flow inlet duct 138. Fluid 136 flows through slots 140 between upstream pole plates 134, through magnetized filamentary matrix 122, between slots 140' and downstream pole plates 134' and discharging into primary flow discharge duct 142. The length of primary flow discharge duct 142 is selected to provide a retention time of thirty seconds to two minutes of non-turbulent flow to enhance formation of colloids.

The magnitude of the gradient of a magnetic field is inversely proportional to the physical size of the magnetized element that creates it, and the depth or distance that the field strength extends from the surface of that element is proportional to the physical size of the element. The most efficient means of producing a uniform field within the magnetic conditioning working volume is with an iron bound solenoid comprised of energizing coil 128 bound by iron flux return 132 and iron pole plates 134. Very high local magnetic field gradients are produced at thousands of sites distributed throughout the working volume by positioning a matrix consisting of a very large number of fine ferromagnetic filaments in the field. The average diameter of such filaments is typically less than 0.5 mm. The filaments are positioned such that they are generally transverse to the direction of the magnetizing field. When fully magnetized, a filament of this size can create a magnetic field gradient of up to 2000 Tesla/meter. Accordingly, the magnitude of the magnetic field anywhere in the working volume can never be less than that of the magnetizing field.

While filamentary matrix 122 is typically constructed from stainless steel wool or expanded metal, other construction techniques and materials will be obvious to one skilled in the art. The preferred use of corrosion resistant, 300 series, stainless steel requires that the matrix manufacturing process introduce adequate cold work into the metal to cause a transition from the austenitic, paramagnetic phase of normal 300 series stainless steel to a martensitic, ferromagnetic phase. Other matrix materials may be used such as 400 series stainless steel which is normally ferromagnetic or nickel which is useful in highly corrosive chemical applications.

Placing the ferromagnetic filament matrix 122 within the magnetic field according to the present invention is unique to the magnetic field conditioning application and represents a far more efficient and much lower cost design than that of the prior art. This will be particularly true for large flow volume applications wherein their use will result in significant reductions in both the size and cost of new system installations. Although the background field for most practical application will be in the range of 0.1 to 2.0 Tesla there may be application which can take advantage of fields as high as 6.0 Tesla which are realistically available with the use of superconducting energizing coils. Alternatively, the magnetic field may be provided by permanent magnets.

It has been found that by providing coagulant introduction and distribution plumbing at the inlet surface of the magnetic conditioning system, the combined magnetic and hydraulic design features allow cost effective treatment of very large flow rate systems and also provide uniformly distributed introduction and thorough mixing of chemical reagents into the flow stream of the water to be treated. The device can thus eliminate the need for costly reagent flash-mixers.

Figure 7:
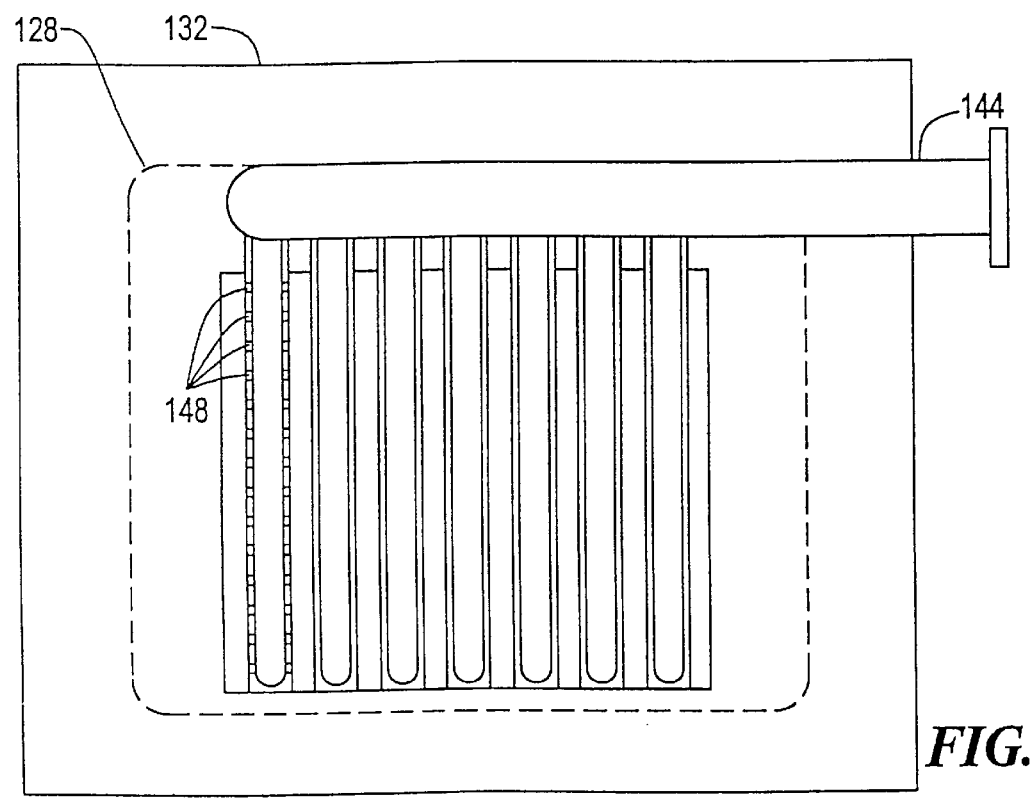
FIG. 7 is an elevational view showing the reagent inlet and flow distribution piping of the magnetic conditioner of FIG. 6.

For contemporaneous magnetic conditioning 12' and coagulation 14, as discussed with reference to FIG. 1, magnetic conditioning means 24, FIG. 6, includes coagulant flow distribution inlet manifold 144 and coagulant flow distribution piping 146. Coagulant 26' flows through input manifold 144 and into distribution piping 146 which discharges coagulant 26' into slots 140 by means of holes 148, FIG. 7, arrayed along the full length of flow distribution piping 146 proximate said slots. Thus, coagulant 26 is thoroughly dispersed throughout primary fluid stream 136 by turbulent mixing induced by matrix 122.

Magnetic conditioning means 24 according to this invention may accommodate a flow rate of 5 million gallons per day, providing 2500 square inches of matrix flow cross sectional area. However, other means for providing distributed flow through the poles of the magnet and for introduction and distribution of chemical reagents or other filter aids into the primary flow streams are possible within the context of this invention.

Other embodiments will occur to those skilled in the art and are within the following claims:

What is claimed is:

1. A method of removing a solute from a fluid, the method comprising:

applying a conditioning magnetic field before flocculation to a fluid which includes a substance dissolved therein in the state of a solute and magnetically enhancing the change of the form of the substance from a dissolved state, to a non-dissolved state, namely a particulate form state, to thereby enhance precipitation of the solute for coagulation, wherein the conditioning magnetic field has an average flux density in the range of greater than 0.2 Tesla to 6.0 Tesla and a field gradient in the range of greater than 60 Tesla/meter to 2000 Tesla/meter, and is parallel to the direction of fluid flow;

adding a coagulant to the fluid proximate the application of the conditioning magnetic field to further effect a transformation of the magnetically conditioned solute from a dissolved state to a non-dissolved, particulate state forming colloids, and to destabilize the colloidal suspension of said particulates by reducing any charge on the surfaces of said particles responsible for repulsion between them; and collecting the colloids for removal from the fluid including the steps of adding a magnetic seed to the fluid and adding a flocculent to the fluid to form flocs.

2. The method for removing solutes of claim 1 in which collecting includes adding magnetic seed to the coagulated solute particles prior to flocculation.

3. The method for removing solutes of claim 2 in which collecting includes recirculating the magnetic seed after removing the flocs from the fluid.

4. The method for removing solutes of claim 3 in which recirculation includes regeneration of said magnetic seed.

5. The method for removing solutes of claim 4 in which regeneration includes demagnetization.

6. The method for removing solutes of claim 5 in which demagnetization includes applying a magnetic field in the range of 0.1 to 1.0 Tesla at 400 Hertz.

7. The method for removing solutes of claim 4 in which regeneration includes cleaning the surface of said magnetic seed.

8. The method for removing solutes of claim 7 in which cleaning the magnetic seed includes washing the magnetic seed with acid.

9. The method for removing solutes of claim 4 in which regeneration includes drying the magnetic seed at a high temperature to calcine the seed surface.

10. The method for removing solutes of claim 9 in which drying the magnetic seed includes heating the magnetic seed with microwaves.

11. The method for removing solutes of claim 3 in which recirculating the magnetic seed includes secondary magnetic filtration of said magnetic seed from the flocs by applying a secondary magnetic field to said flocs.

12. The method for removing solutes of claim 11 in which the secondary magnetic field has an average flux density in the range of 0.1 to 2.0 Tesla.

13. The method for removing solutes of claim 11 in which the secondary magnetic field has a field gradient in the range of 1 to 1000 Tesla/meter.

14. The method for removing solutes of claim 11 in which said secondary magnetic field is applied parallel to a direction of fluid flow.

15. The method for removing solutes of claim 11 in which recirculating the magnetic seed includes flushing the magnetic seed with water.

16. The method for removing solutes of claim 3 in which said collecting includes shearing said flocs into small pieces.

17. The method for removing solutes of claim 16 in which said shearing includes agitating said flocs.

18. The method for removing solutes of claim 16 in which shearing includes shearing said flocs through turbulent fluid flow.

19. The method for removing solutes of claim 2 in which collecting includes primary magnetic filtration by applying a primary magnetic field to the flocs, after flocculation has been completed, to remove the flocs from the fluid.

20. The method for removing solutes of claim 19 in which the primary magnetic field has an average flux density in the range of 0.1 to 6.0 Tesla.

21. The method for removing solutes of claim 19 in which said primary magnetic field has a field gradient in the range of 1 to 2000 Tesla/meter.

22. The method for removing solutes of claim 19 in which the primary magnetic field is applied parallel to the direction of a fluid flow.

23. The method for removing solutes of claim 2 in which collecting includes separating the flocs by sedimentation, after flocculation has been completed, to remove the flocs leaving a clear fluid overflow.

24. The method for removing solutes of claim 23 in which separating includes supplemental magnetic filtration for filtering small flocs from said overflow.

25. The method for removing solutes of claim 2 in which the magnetic seed is magnetite.

26. The method for removing solutes of claim 1 in which collecting includes mixing at low r.p.m.'s, after adding flocculant, to create large, loose flocs.

27. The method for removing solutes of claim 26 in which the mixing at low r.p.m.'s occurs for at least 30 seconds.

28. The method for removing solutes of claim 1 in which the coagulant is alum.

29. The method for removing solutes of claim 28 in which the percent by volume of alum is as a 48.6% solution and fed in the system at a rate of 10 to 100 ppm.

30. The method for removing solutes of claim 1 in which said conditioning magnetic field gradient is 100 Tesla/meter.

31. The method for removing solutes of claim 1 in which collecting includes separating the flocs by sedimentation, after flocculation has been completed, to remove the flocs leaving a clear fluid overflow.

32. The method for removing solutes of claim 1 in which the fluid contains less than 0.1 ppm of solute after collecting the colloids.

33. The method for removing solutes of claim 1 in which the coagulant is ferric chloride.

34. The method for removing solutes of claim 1 in which the coagulant is lime.

35. The method for removing solutes of claim 1 in which the flocculant is anionic.

36. The method for removing solutes of claim 1 in which the flocculent is cationic.

37. The method for removing solutes of claim 1 in which the nucleation agent is bentonite.

38. The method for removing solutes of claim 1 in which the solute is phosphate.

39. A system for removing a solute from a fluid using magnetically conditioned coagulation comprising:

means for magnetically conditioning the fluid before flocculation by applying a conditioning magnetic field parallel to a direction of fluid flow and having an average flux density in the range of greater than 0.2 Tesla to 6.0 Tesla and a field gradient in the range of greater than 60 Tesla/meter to 2000 Tesla/meter, to enhance the precipitation of solute particles for coagulation;

means for adding a coagulant to the fluid proximate the application of the conditioning magnetic field to coagulate the increased available solute particles to form colloids; and means for collecting the colloids from the fluid.

40. The system for removing solutes of claim 39 in which said means for collecting further includes flocculation means, for producing flocs of said available solute particles.

41. The system for removing solutes of claim 40 in which said means for collecting further includes seeding means, for adding magnetic seed to the magnetically conditioned fluid.

42. The system for removing solutes of claim 41 in which said means for collecting further includes seed collection means for collecting the magnetic seed from the separated flocs and recirculating means for recirculating said magnetic seed collected by said seed collection means to said seeding means.

43. The system for removing solutes of claim 42 in which said recirculating means includes regeneration means for regenerating said magnetic seed.

44. The system for removing solutes of claim 43 in which said regeneration means includes drying means.

45. The system for removing solutes of claim 44 in which said drying means includes microwave means for applying microwave energy to said magnetic seed to dry the seed.

46. The system for removing solutes of claim 43 in which said regeneration means includes demagnetization means for demagnetizing said magnetic seed.

47. The system for removing solutes of claim 43 in which said regeneration means includes acidic wash means for cleaning the surface of said magnetic seed.

48. The system for removing solutes of claim 42 in which said seed collection means includes secondary magnetic filtration means.

49. The system for removing solutes of claim 48 in which said secondary magnetic filtration means includes a secondary magnetic separator.

50. The system for removing solutes of claim 49 in which said secondary magnetic separator is a continuous high gradient magnetic separator.

51. The system for removing solutes of claim 49 in which said secondary magnetic separator is a cyclic high gradient magnetic separator.

52. The system for removing solutes of claim 49 in which said secondary magnetic separator is a wet-drum type magnetic separator.

53. The system for removing solutes of claim 49 in which said secondary magnetic separator includes a filamentary matrix.

54. The system for removing solutes of claim 42 in which said seed collection means further includes shearing means for separating said magnetic seed from said flocs.

55. The system for removing solutes of claim 41 in which said means for collecting further includes separator means, responsive to said flocculation means, for separating said flocs from the fluid.

56. The system for removing solutes of claim 55 in which said separator means includes primary magnetic filtration means, responsive to said magnetic seeds, for applying a primary magnetic field to said flocs to separate said flocs from said fluid.

57. The system for removing solutes of claim 56 in which said primary magnetic filtration means includes a primary magnetic separator.

58. The system for removing solutes of claim 51 in which said primary magnetic separator is a continuous high gradient magnetic separator.

59. The system for removing solutes of claim 51 in which said primary magnetic separator is a cyclic high gradient magnetic separator.

60. The system for removing solutes of claim 51 in which said primary magnetic separator is a wet-drum type magnetic separator.

61. The system for removing solutes of claim 57 in which said primary magnetic separator includes a filamentary matrix.

62. The system for removing solutes of claim 56 in which said primary magnetic field is a high field of at least 0.1 Tesla.

63. The system for removing solutes of claim 56 in which said primary magnetic field has a high magnetic field gradient of at least 1 Tesla/meter.

64. The system for removing solutes of claim 55 in which said separator means includes sedimentation means in which said flocs settle to the bottom of said sedimentation means and clear fluid over flows said sedimentation means.

65. The system for removing solutes of claim 64 in which said separator means further includes supplemental magnetic filtration means for filtering small flocs from said fluid overflow.

66. The system for removing solutes of claim 41 in which said magnetic seed is magnetite.

67. The system for removing solutes of claim 40 in which said means for collecting further includes separator means, responsive to said flocculation means, for separating said flocs from the fluid.

68. The system for removing solutes of claim 67 in which said separator means includes sedimentation means in which said flocs settle to the bottom of said sedimentation means and clear fluid over flows said sedimentation means.

69. The system for removing solutes of claim 38 in which said means for magnetically conditioning includes a filamentary matrix.

70. The system for removing solutes of claim 69 in which said filamentary matrix comprises stainless steel.

71. The system for removing solutes of claim 70 in which said stainless steel has been cold worked to induce an austenitic to martensitic phase transformation.

72. The system for removing solutes of claim 69 in which said matrix is bounded by an iron bound solenoid.

73. The system for removing solutes of claim 72 in which said matrix is bounded about its periphery by a DC energizing coil for producing said magnetic field.

74. The system for removing solutes of claim 69 in which said filamentary matrix comprises an upstream end and a downstream end, said upstream end bounded by a first magnetic pole having a plurality of passage ways therethrough and said downstream end bounded by a second magnetic pole having a plurality of passage ways therethrough, such that a fluid flow is a allowed to pass through said first magnetic pole, said upstream end, said downstream end and said second magnetic pole.

75. The system for removing solutes of claim 74 in which said first and said second magnetic poles are oriented to provide uniform application of the conditioning magnetic field to said matrix.

76. The system for removing solutes of claim 69 in which said filamentary matrix has length of 6 to 12 inches in the direction of a fluid flow.

77. The system for removing solutes of claim 69 in which said filamentary matrix is bounded at an upstream end by a first permanent magnet and at a downstream end by a second permanent magnet, said permanent magnets producing said conditioning magnetic field.

78. The system for removing solutes of claim 39 in which said means for magnetically conditioning includes an outlet port for discharging said fluid to a region of non-turbulent flow.

79. The system for removing solutes of claim 78 in which said region provides a retention time of at least 15 seconds to enhance formation of said colloids.

80. The system for removing solutes of claim 39 in which said means for magnetically conditioning further includes an upstream end and a downstream end, and said means for adding a coagulant further includes introduction means for introducing said coagulant to said fluid.

81. The system for removing solutes of claim 80 in which said introduction means further includes distribution means for uniformly distributing said coagulant over said upstream end.

82. The system for removing solutes of claim 39 in which said means for adding a coagulant further includes nucleation means for adding a nucleation agent.

83. The system for removing solutes of claim 39 in which said means for magnetically conditioning includes an upstream end and a downstream end and inlet means for uniformly introducing said fluid over said upstream end of said means for magnetically conditioning.

84. The system for removing solutes of claim 39 in which said fluid contains less than 0.1 ppm of solute after removal of the solute particles.

85. The system for removing solutes of claim 39 in which the solute is phosphate.

86. The system for removing solutes of claim 39 in which said fluid flows at a rate 10 cm/sec.

87. A method of removing a solute from a fluid using magnetically conditioned coagulation comprising:

magnetically conditioning the fluid by applying a conditioning magnetic field to the fluid to enhance the precipitation of solute particles for coagulation, wherein the conditioning magnetic field has an average flux density in the range of greater than 0.2 Tesla to 6.0 Tesla and a field gradient in the range of greater than 60 Tesla/meter to 2000 Tesla/meter, and is parallel to the direction of fluid flow;

adding a nucleation agent to the fluid after the application of the conditioning magnetic field to coagulate the increased available solute particles to form colloids; and collecting the colloids for removal from the fluid.

88. A system for removing a solute from a fluid using magnetically conditioned coagulation comprising:

means for magnetically conditioning the fluid by applying a conditioning magnetic field parallel to a direction of fluid flow and having an average flux density in the range of greater than 0.2 Tesla to 6.0 Tesla and a field gradient in the range of greater than 60 Tesla/meter to 2000 Tesla/meter, to enhance the precipitation of solute particles for coagulation;

means for adding a nucleation agent to the fluid after the application of the conditioning magnetic field to coagulate the increased available solute particles to form colloids; and means for collecting the colloids from the fluid.

89. A method of removing a solute from a fluid, the method comprising:

applying a conditioning magnetic field before flocculation to a fluid which includes a substance dissolved therein in the state of a solute and magnetically enhancing the change of the form of the substance from a dissolved state to a non-dissolved state, namely a particulate form state, to thereby enhance precipitation of the solute for coagulation, wherein the conditioning magnetic field has an average flux density in the range of greater than 0.2 Tesla to 6.0 Tesla and a field gradient in the range of greater than 60 Tesla/meter to 2000 Tesla/meter, and is parallel to the direction of fluid flow;

adding a coagulant to the fluid proximate the application of the conditioning magnetic field to further effect a transformation of the magnetically conditioned solute from a dissolved state to a non-dissolved, particulate state forming colloids and to destabilize the colloidal suspension of said particulates by reducing any charge on the surfaces of said particles responsible for repulsion-between them; and collecting the colloids for removal from the fluid.

* * * * *

UNITED STATES PATENT AND TRADEMARK OFFICE
CERTIFICATE OF CORRECTION

PATENT NO. : 6,099,738
DATED : August 8, 2000
INVENTOR(S) : Ionel Wechsler; Peter G. Marston, both of Gloucester, Mass.

It is certified that error appears in the above-identified patent and that said Letters Patent is hereby corrected as shown below:

Column 17, claim 58,
Line 1, the number "51" should be removed, and the number -- 57 -- should be inserted in its place Column 17, claim 59,
Line 4, the number "51" should be removed, and the number -- 57 -- should be inserted in its place Column 17, claim 60,
Line 7, the number "51" should be removed, and the number -- 57 -- should be inserted in its place Column 17, claim 69,
Line 37, the number "38" should be removed, and the number -- 39 -- should be inserted in its place.

Signed and Sealed this

Ninth Day of October, 2001

*Attest:*

*Attesting Officer*

NICHOLAS P. GODICI
*Acting Director of the United States Patent and Trademark Office*